(12) United States Patent
Zhu et al.

(10) Patent No.: US 7,148,268 B2
(45) Date of Patent: Dec. 12, 2006

(54) OPAQUE INK JET INK COMPOSITION

(75) Inventors: Linfang Zhu, Naperville, IL (US); Fengfei Xiao, Northbrook, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 203 days.

(21) Appl. No.: 10/692,917

(22) Filed: Oct. 24, 2003

(65) Prior Publication Data

US 2005/0090579 A1    Apr. 28, 2005

(51) Int. Cl.
*C09D 11/10* (2006.01)
*C08L 33/02* (2006.01)
*C08L 39/00* (2006.01)

(52) U.S. Cl. .................. 523/160; 524/522; 524/555; 524/556

(58) Field of Classification Search ............... 523/160, 523/161
See application file for complete search history.

(56) References Cited

U.S. PATENT DOCUMENTS

| | | | |
|---|---|---|---|
| 5,275,646 A * | 1/1994 | Marshall et al. | ......... 106/31.32 |
| 5,443,628 A | 8/1995 | Loria et al. | |
| 5,596,027 A | 1/1997 | Mead et al. | |
| 5,652,286 A | 7/1997 | Deng | |
| 5,693,127 A | 12/1997 | Nigam et al. | |
| 5,738,716 A * | 4/1998 | Santilli et al. | ........... 106/31.77 |
| 5,744,519 A | 4/1998 | Heraud et al. | |
| 5,800,601 A | 9/1998 | Zou et al. | |
| 5,977,207 A * | 11/1999 | Yui et al. | .................... 523/160 |
| 6,010,564 A | 1/2000 | Zhu et al. | |
| 6,133,342 A | 10/2000 | Mizobuchi et al. | |
| 6,140,391 A | 10/2000 | Zou et al. | |
| 6,221,933 B1 | 4/2001 | Zhu et al. | |
| 6,235,829 B1 | 5/2001 | Kwan | |
| 6,251,175 B1 | 6/2001 | Zhu et al. | |
| 6,261,348 B1 | 7/2001 | Kwan et al. | |
| 6,372,819 B1 | 4/2002 | Mizobuchi et al. | |
| 6,378,999 B1 * | 4/2002 | Doi et al. | .................... 347/100 |
| 6,444,019 B1 | 9/2002 | Zou et al. | |
| 6,478,861 B1 | 11/2002 | Kwan et al. | |
| 6,645,280 B1 * | 11/2003 | Zhu et al. | ................. 106/31.27 |
| 6,726,756 B1 * | 4/2004 | Zou et al. | ................. 106/31.57 |
| 6,747,072 B1 * | 6/2004 | Siddiqui | .................... 523/161 |
| 6,988,795 B1 * | 1/2006 | Doi | .......................... 347/100 |
| 2003/0144375 A1 * | 7/2003 | Wu et al. | .................... 523/160 |
| 2003/0227531 A1 * | 12/2003 | Hosoi et al. | ................. 347/105 |
| 2004/0110868 A1 * | 6/2004 | Zhu et al. | .................... 523/160 |
| 2004/0154495 A1 * | 8/2004 | Zhu et al. | ................. 106/31.41 |
| 2005/0101694 A1 * | 5/2005 | Elmer et al. | ................. 523/160 |

FOREIGN PATENT DOCUMENTS

| WO | WO 98/27170 A1 | 6/1998 |
|---|---|---|
| WO | WO 00/63305 | 10/2000 |

* cited by examiner

*Primary Examiner*—Callie Shosho
(74) *Attorney, Agent, or Firm*—Leydig, Voit & Mayer, Ltd.

(57) ABSTRACT

Disclosed is an ink jet ink composition comprising one or more organic solvents, an acidic resin, a polyamine, an opaque pigment, and a hydrophobic conductive agent. The ink jet ink composition of the present invention has one or more of the following advantages. The ink jet ink composition has a short ink dry time, the ink is able to print on glass under cold and/or not cold temperatures, and under humid and/or dry conditions; the printed messages have excellent adhesion to the substrate, and the printed message can be removed by a caustic wash.

25 Claims, No Drawings

OPAQUE INK JET INK COMPOSITION

FIELD OF THE INVENTION

This invention pertains to an opaque ink jet ink composition suitable for printing on dark colored substrates, particularly dark colored glass substrates, for example, dark colored returnable glass beverage bottles, that may be exposed to condensation or water before, during, or after printing. The messages printed on glass substrates resist damage when exposed to water and humid conditions, and the messages are removable by a caustic wash.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream, e.g., electronically, so that the droplets are caused to form the desired printed message on that surface.

The technique of ink jet printing or non-contact printing is particularly well suited for application of characters onto irregularly shaped substrates and surfaces, including, for example, glass, metal, or plastic containers, generally used for holding beverage, cosmetic, pharmaceutical, liquor, and health care products.

In general, an ink jet ink composition must meet certain requirements to be useful in ink jet printing operations. These relate to the viscosity and electrical resistivity of the ink jet ink composition, the solubility and compatibility of the components of the ink jet ink composition, and the wettability of the substrate by the ink jet ink composition. Further, the ink jet ink composition must be quick-drying and smear resistant; and the ink jet ink composition must be capable of passing through the ink jet nozzle or nozzles without clogging and permit rapid cleanup of the machine components with minimum effort. The printed message must have good adhesion and resist rubbing.

In addition, the ink jet ink composition must meet certain other requirements. Many beverage manufacturers fill the containers with chilled beverages, frequently under humid conditions that promote condensation of moisture on the containers. The moisture that condenses during printing on the container surfaces poses a severe problem in obtaining the desired ink penetration, good adhesion, and abrasion resistance of the printed messages. Thus, the ink jet ink composition should allow printing on these containers in the presence of a certain level of condensation, and the printed messages should not be damaged by the condensation. Further, when the containers are immersed in ice water for chilling or exposed to hot water during pasteurization, the printed messages should not disintegrate or be damaged by such treatments. Moreover, the bottles may be exposed to warm and humid conditions, e.g., during warehousing and shipping to different parts of the world and in different seasons. The messages should not be damaged by the hot and cold humid conditions. In addition, since many such containers are returned or redeemed for value, and reused, the messages on the containers should be removable by a caustic wash.

Ink jet ink compositions have been proposed for printing on glass substrates. However, these ink compositions have one or more drawbacks; for example, the ink dry time is excessively long or the ink composition is unsuitable for printing on dark colored glass substrates; or the printed message lacks sufficient adhesion to the substrate, resistance to damage by hot or cold water, or caustic washability.

The foregoing shows that there exists a need for an ink jet ink composition suitable for printing on glass substrates. The advantages of the present invention as well as additional inventive features will be apparent from the description of the invention provided herein.

BRIEF SUMMARY OF THE INVENTION

The present invention provides an ink jet ink composition suitable for printing on glass substrates comprising one or more organic solvents, one or more acidic resins, one or more polyamines, one or more opaque pigments, and one or more hydrophobic conductive agents. The ink jet ink composition of the present invention has one, two, or more of the following advantages. The ink jet ink composition is stable, has low sedimentation rates, has a short ink dry time, and is able to print on glass substrates under cold and/or not cold temperatures and under humid and/or dry conditions. The printed message has good contrast and adhesion to the substrate, and the printed message can be removed, if desired, by a caustic wash. The printed message resists damage by ice water immersion and/or pasteurization.

DETAILED DESCRIPTION OF THE INVENTION

The foregoing need has been fulfilled to a great extent by the present invention, which provides, in an embodiment, an ink jet ink composition comprising one or more organic solvents, an acidic resin, a polyamine, an opaque pigment, and a hydrophobic conductive agent. The present invention provides opaque ink jet ink compositions having excellent wet adhesion, excellent contrast on both clear and dark glass surfaces after pasteurization, and good aging stability. Furthermore, such compositions provide the advantages of lower pigment sedimentation rate than titanium dioxide based compositions, thereby making it possible to use standard non-pigmented printers for printing opaque codes or messages. The messages printed on glass bottles from the ink jet ink composition of the present invention can be removed completely in a relatively short period of time by a caustic wash.

The ink jet ink composition of the present invention is suitable for use in continuous or drop-on-demand ink jet printers. For use in continuous ink jet printers, the ink jet ink composition generally has the following characteristics: (1) a viscosity of from about 1.6 to about 7.0 cps at 25° C.; (2) an electrical resistivity of from about 50 to about 2000 ohm-cm; and (3) a sonic velocity of from about 1100 to about 1700 meters/second.

The opaque pigment can be an inorganic pigment, or preferably an organic pigment. To provide opacity, the pigment should have an appropriate particle size to be able to scatter visible light. Accordingly, in accordance with an embodiment of the invention, the particle size of the opaque pigment is in the range of from about 0.1 µm to about 1.0 µm, and preferably from about 0.2 µm to about 0.5 µm. The opaque pigment has a different refractive index than the binder resin, and the greater the difference in refractive index between the binder and the pigment, the greater the opacity of the pigment. The pigment used in the ink jet ink composition of the present invention can be of any suitable color, preferably yellow. In an embodiment, the pigment is an opaque organic yellow pigment, for example, C.I. Pigment Yellow 139. C.I. Pigment Yellow 139 is available commercially as TINTERSOL™ Yellow 139 from Johnson Matthey, Inc., Jacksonville, Fla. TINTERSOL Yellow 139 is a dispersion of C.I. Pigment Yellow 139 in aldehyde resin, methoxypropyl acetate and surfactant. According to the supplier's literature, the TINTERSOL Yellow 139 dispersion also contains a proprietary resin. The opaque pigment can be present in any suitable amount, for example, from about 2% to about 15%, preferably from about 3% to about 10%, and more preferably from about 4% to about 8% by weight of the ink jet ink composition.

The ink jet ink composition of the present invention contains one or more organic solvents. Any suitable organic solvent can be used as the ink carrier. Preferably, an organic solvent that has a low boiling point and/or a mixture of such solvents is used as the main ink carrier. Small amounts of high boiling solvents can also be employed in combination with the low boiling solvent(s). Examples of suitable organic solvents include ketones, such as acetone, methyl ethyl ketone, diethyl ketone, methyl isobutyl ketone, and cyclohexanone; esters such as methyl acetate, ethyl acetate, n-propyl acetate, isopropyl acetate, n-butyl acetate, t-butyl acetate, amyl acetate, methyl lactate, ethyl lactate, n-propyl lactate, isopropyl lactate, n-butyl lactate, and methoxypropyl acetate; alcohols such as methanol, ethanol, n-propanol, isopropanol, n-butanol, t-butanol, n-pentanol, and n-hexanol; glycols such as ethylene glycol, propylene glycol, glycerin, and diethylene glycol; glycol ethers such as methoxypropanol, ethylene glycol dimethyl ether, ethylene glycol diethylether, cellosolve, diethyleneglycol dimethylether, and diethylene glycol diethylether; and amides, as well as mixtures of two or more of the foregoing. Preferably, the organic solvent comprises lower ketones, lower alcohols, or mixtures thereof. Methyl ethyl ketone is a preferred solvent.

Any suitable amount of organic solvent or mixture of organic solvents, including co-solvents, can be present, for example, in an amount of from about 40% to about 90% by weight, preferably in an amount of from about 60% to about 80% by weight, and more preferably from about 65% to about 75% by weight of the ink jet ink composition. The ink jet ink composition of the present invention can optionally include a co-solvent. For example, methyl ethyl ketone can be used in combination with a co-solvent, e.g., methoxypropyl acetate or ethanol.

If a co-solvent is used, it is used in an amount smaller than the main solvent. For example, the main solvent is used in an amount of about two, three, four, five, or more times the amount of the co-solvent. If methyl ethyl ketone is the main organic solvent, for example, ethanol can be used as the co-solvent. In accordance with an embodiment of the present invention, the ink jet ink composition includes from about 40% to about 60% by weight of methyl ethyl ketone and from about 5% to about 20% by weight of ethanol, and preferably about 50% by weight methyl ethyl ketone and about 10% by weight of ethanol.

The ink jet ink composition can also contain water, e.g., deionized water. Without wishing to be bound by any theory or mechanism, it is believed that water facilitates printing under dry or low humidity ambient conditions, e.g., when the relative humidity is about 50% or less, e.g., when the relative humidity is from about 10% to about 42%, or from about 20% to about 30%. The amount of water in the ink, however, should preferably be small, e.g., from about 1% to about 20%, preferably from about 5% to about 15%, and more preferably about 10% by weight of the ink composition. Excessive amounts of water tend to increase ink dry times and cause ink instability.

The ink jet ink composition of the present invention contains at least one acidic resin. Any suitable acidic resin, e.g., a polymer having a carboxyl, sulfonic, or phosphonic, preferably, carboxyl, group can be used. The acidic resin can have any suitable acid number, for example, an acid number of from about 50 to about 250, and preferably from about 100 to about 200, mg of KOH/g of the resin. In certain embodiments of the invention, the acidic resin has an acid number of from about 120 to about 170 mg of KOH/g of the resin. The acidic resin may be soluble or dispersible in the organic solvent. Acidic resins can be prepared by methods generally known in the art, for example, by polymerizing a monomer or a mixture of monomers using a suitable catalyst. The mixture of monomers can include only acidic monomers or one or more acidic monomers and one or more non-acidic (neutral) monomers. For example, a mixture of styrene and acrylic acid can be polymerized using a redox catalyst such as ammonium persulfate-hydrogen peroxide or Fenton's reagent (ferrous sulfate-hydrogen peroxide). The number of acidic (e.g., carboxyl) groups can be adjusted by controlling the relative amount of the monomers in the monomer mixture. Alternatively, acid resins can be generated from resins having ester functionality.

An example of the acidic resin is an acrylic resin. The acrylic resin may be a homopolymer or a copolymer. An example of a copolymer is a styrene acrylic copolymer. A preferred acrylic resin is JONCRYL™ 683, which is a copolymer of styrene, alpha methyl styrene, and acrylic acid, available from Johnson Wax in Racine, Wis. JONCRYL 683 has an acid number of about 160 mg of KOH/g of resin. For additional examples of acidic resins, see U.S. Pat. Nos. 5,596,027 and 6,221,933, the disclosures of which are incorporated by reference.

The acidic resin can be used in any suitable amount, for example, in an amount suitable to provide a residual acid function; for example, the amount of acid functionality is greater than that of the amine functionality of the polyamine. The acidic resin can be used in an amount of from about 2% to about 25% by weight, preferably in an amount of from about 5% to about 20% by weight, and more preferably in an amount of from about 7% to about 15% by weight of the ink jet ink composition.

The ink jet ink composition of the present invention contains a polyamine. Any suitable polyamine can be used. It is believed that the amino groups of the polyamine interact with the acidic resin to form a durable printed message that resists damage from condensation of moisture and/or resists smearing or damage when exposed to ice water. Without wishing to be bound to any theory or mechanism, it is believed that the interaction between the polyamine and the acidic resin may involve formation of covalent bonds, ionic, hydrogen bonding, van der Waals interactions, dipole-dipole interactions, dipole-induced dipole interactions, or any combinations thereof. An example of ionic interaction is the formation of an ammonium salt. The polyamine has two, three, four, or more amino groups per molecule. It can be a small molecule or preferably a dimeric, trimeric, or polymeric molecule. The polyamine may be linear, branched, uncrosslinked, crosslinked, or three-dimensional. The amino group can be primary, secondary, tertiary, or a combination thereof. The amino group can be part of the backbone of a polymer, a chain end, a pendant group, or a combination thereof.

A suitable polyamine is a polyalkyleneamine, e.g., polyethyleneimine. The polyalkyleneamine can be a modified polyalkyleneamine, e.g., an alkoxylated, epoxylated, or silylated polyalkyleneamine. Thus, for example, the polyethyleneimine can be modified by ethoxylation, epoxylation, or silylation. Other examples of polyamines include dendrimers and aminoacrylic polymers, as disclosed in U.S. Pat. Nos. 5,596,027 and 6,221,933, incorporated above. Polyethyleneimine can be obtained commercially, e.g., from Aldrich. The polyamine, e.g., polyethyleneimine, can be of any suitable molecular weight, preferably below a weight average molecular weight of about 10,000, and more preferably about 2000.

The polyamine can be used in any suitable amount. Typically, the amount of the polyamine is chosen such that the amine groups do not take up all of the acid functionality of the acidic resin. Thus, for example, the polyamine can be present in an amount of from about 0.01% to about 2% by weight, preferably from about 0.05% to about 1% by weight, and more preferably from about 0.1% to about 0.5% by weight of the ink jet ink composition.

The ink jet ink composition of the present invention contains one or more hydrophobic conductive agents. Hydrophobic conductive agents have no or low solubility in water, for example, a solubility in water of about 0.5% by weight or less at 25° C., and preferably a solubility of about 0.1% by weight or less at 25° C. Any suitable hydrophobic conductive agent can be used. Examples of hydrophobic conductive agents include ammonium or phosphonium salts, and borate and phosphate salts. Preferably, the hydrophobic conductive agent comprises a cation selected from the group consisting of tetraalkylammonium, tetraarylammonium, tetraalkylphosphonium, tetraarylphosphonium, and any combinations thereof, and an anion selected from the group consisting of hexafluorophosphate, tetrafluoroborate, tetraalkylborate, tetraarylborate, and any combinations thereof.

Examples of specific hydrophobic conductive agents include tetrabutylammonium hexafluorophosphate, tetrapropylammonium hexafluorophosphate, tetraethylammonium hexafluorophosphate, tetramethylammonium hexafluorophosphate, tetrabutylammonium tetraphenylborate, tetrabutylammonium tetrabutylborate, tetrabutylammonium tetrafluoroborate, tetrapropylammonium tetrafluoroborate, tetraethylammonium tetrafluoroborate, tetramethylammonium tetrafluoroborate, and any combinations thereof, preferably tetrabutylammonium hexafluorophosphate, tetrapropylammonium hexafluorophosphate, tetrabutylammonium tetrafluoroborate, tetrabutylammonium tetraphenylborate, and any combinations thereof, and more preferably tetrabutylammonium hexafluorophosphate, available from Ozark Fluorine Specialties Inc. in Tulsa, Okla.

The hydrophobic conductive agent can be present in the ink jet ink composition of the present invention in any suitable amount. The hydrophobic conductive agent is typically present in an amount of less than about 5% by weight, e.g., from about 0.1% to about 5% by weight, preferably from about 0.5% to about 3% by weight, and more preferably from about 1% to about 2% by weight of the ink jet ink composition.

The ink jet ink composition of the present invention can also include one, two, three, or more additives, for example, a humectant, a co-resin, a defoamer, an adhesion promoter, a plasticizer, a dispersing agent, and/or a surfactant.

The ink jet ink composition of the present invention can include a humectant to prevent drying of the ink on the print head during the printing operation, as well as during storage of the ink. Humectants are typically hydrophilic solvents having high boiling points, preferably above 100° C., and more preferably from about 150° to about 250° C. Any suitable humectant known to those of ordinary skill in the art can be used. Examples of suitable humectants include glycols such as ethylene glycol, propylene glycol, glycerin, diglycerin, and diethylene glycol; glycol ethers such as ethylene glycol dimethyl ether, ethylene glycol diethylether, propyleneglycol methylether, cellosolve, diethylene glycol monoethylether (Carbitol), diethylene glycol dimethylether, and diethylene glycol diethylether; dialkyl sulfoxides such as dimethyl sulfoxide, and other solvents such as sulfolane and N-methylpyrrolidone. The humectant can be present in an amount of from about 0.1% to about 10% by weight of the ink composition, and preferably from about 1% to about 5% by weight of the ink jet ink composition.

The ink jet ink composition of the present invention can include one or more co-resins. The co-resin can provide improved dispersability of the pigment and/or stability of the ink composition. An example of a co-resin is an aldehyde resin such as urea-aldehyde resin or ketone resin.

The ink jet ink composition of the present invention can include a defoamer to prevent foaming of the ink during its preparation, as well as during the printing operation. Any suitable defoamer, for example, polysiloxane defoamers can be used. An example of a polysiloxane defoamer is BYK™ 065 from BYK-Chemie, in Wallingford, Conn. The defoamer can be present in any suitable amount, for example, in an amount of from about 0.01% to about 1% by weight, preferably in an amount of from about 0.1% to about 0.5% by weight of the ink composition.

The ink jet ink composition of the present invention can also include a suitable adhesion promoter, e.g., a silane, to further improve the adhesion of the printed message to glass substrates. An example of a suitable silane is an epoxysilane such as the WET LINK™ 78, available from GE Silicones, which is 3-glycidoxy-propylmethyl-dimethoxy-silane. The adhesion promoter can be present in any suitable amount, for example, from about 0.01% to about 3% by weight, preferably in an amount of from about 0.1% to about 2% by weight, and more preferably in an amount of from about 0.5% to about 1.5% by weight of the ink composition.

The ink jet ink composition of the present invention can also include a plasticizer to further enhance the properties, e.g., durability, of the printed message. Any suitable plasticizer can be used. For example, Rit-Cizer 8, which is an o,p-mixture of N-ethyltoluenesulfonamide available from Rit-Chem Co., can be used. The plasticizer can be present in any suitable amount, for example, in an amount of from about 0.01% to about 3% by weight, preferably in an amount of from about 0.1% to about 2% by weight, and more preferably in an amount of from about 0.5% to about 1.5% by weight, of the ink composition.

The ink jet ink composition of the present invention can further include a surfactant to optimize the wetting and/or drying characteristics of the ink. Any suitable surfactant can be employed, for example, fluoroaliphatic polymeric esters and polyalkylene oxide modified polydimethylsiloxanes. Examples of suitable surfactants include SILWET™ L-7622, which is a polyethyleneoxide modified polydimethylsiloxane, available from OSi Specialties, Inc. in Danbury, Conn., and FC 430, which is a fluoroaliphatic polymeric ester, available from 3M Co. The surfactant can be present in the ink composition in any suitable amount, for example, in an amount of from about 0.01% to about 2% by weight, and preferably in an amount of from about 0.05% to about 0.5% by weight of the ink composition.

The ink jet ink composition of the present invention can include a dispersing agent, for example, a polymeric dispersing agent, to enhance pigment stabilization or reduce sedimentation rate. Hyperdispersants, which are polymeric dispersing agents containing groups with affinity for pigments, can be employed. An example of a hyperdispersant is SOLSPERSE™ 38500, available from Avecia in Wilmington, Del. Other examples of hyperdispersants can be found in the literature, for example, see WO00/63305, the disclosure of which is incorporated by reference. The dispersing agent can be used in any suitable amount, for example, in an amount of from about 0.1% to about 5% by weight, and preferably in an amount of from about 0.5% to about 2% by weight of the ink composition.

In accordance with an embodiment, the ink jet ink composition of the present invention comprises one or more organic solvents in an amount of from about 40% to about 90% by weight, one or more acidic resins in an amount of from about 2% to about 25% by weight, one or more polyamines in an amount of from about 0.05% to about 2% by weight, one or more opaque pigments (e.g., opaque organic pigments) in an amount of from about 2% to about 15% by weight, and one or more hydrophobic conductive agents in an amount of from about 0.1% to about 5% by weight of the ink jet ink composition.

In accordance with another embodiment, the ink jet ink composition of the present invention contains one or more organic solvents in an amount of from about 60% to about 80% by weight, one or more acidic resins in an amount of from about 5% to about 20% by weight, one or more polyamines in an amount of from about 0.1% to about 0.5% by weight, one or more opaque pigments (e.g., opaque organic pigments) in an amount of from about 2% to about 10% by weight, and one or more hydrophobic conductive agents in an amount of from about 1% to about 2% by weight of the ink jet ink composition.

The ink jet ink composition of the present invention can be prepared by combining the required ingredients and mixing them in a suitable mixing device, for example, a blender. The resulting product can be filtered.

The present invention further provides a method for printing a mark on a substrate comprising directing a stream of droplets of the ink jet ink composition of the present invention onto a substrate and controlling the direction of the droplets so as to form the mark on the substrate. The ink jet ink composition of the present invention can be printed on a variety of glass bottles. Examples of suitable glass bottles include beer bottles, the returnable and non-returnable varieties. The ink jet ink composition of the present invention may be applied onto a variety of glasses, including soda-lime glasses, borosilicate glasses, alumino-silicate glasses, lead glasses, and borate glasses. The glass containers may contain a coating thereon or may be free of a coating.

The ink jet ink composition of the present invention has one or more of the following advantages. The messages printed using the ink jet ink composition of the present invention on glass bottles pass accelerated aging test at 62° C. for 4 weeks. The messages printed on glass bottles resist damage due to condensation; messages printed on glass bottles at a relatively dry atmosphere, e.g., 71° F. and 42% RH and 72° F. and 30% RH, when exposed to a humid condition, e.g., 95° F. and 95% RH for 1 minute or 5 minutes right after printing, resist damage due to moisture condensation. The messages do not rub off when rubbed ten times with a thumb under hard pressure after the high humidity and high temperature exposure.

The messages printed on glass bottles resist damage when immersed in ice water. For example, messages printed on glass bottles at 71° F. and 42% RH and 72° F. and 30% RH are allowed to set for a period of 16 hours under ambient conditions, and immersed in ice water for a period of 15 hours. The messages pass a 10-rub test with the thumb under hard pressure.

The messages do not damage under pasteurization conditions. For example, messages printed on glass bottles at 72° F. and 30% RH, and allowed to stand for 5 minutes, are pasteurized for a period of 35 minutes in water at 70° C., allowed to stand at ambient conditions for a period of 10 minutes, and immersed for a period of 15 hours in ice water. The messages do not rub off after the immersion in ice water. The printed messages provide excellent visual contrast on dark brown and dark green bottles after pasteurization.

The messages can be removed by a caustic wash. For example, messages printed on glass bottles are allowed to set for a period of 48 hours at ambient conditions. The messages are removed completely by washing with either a 3% by wt. sodium hydroxide solution at 60° C. or a 3% by wt. sodium hydroxide solution containing an additive (e.g., Divo Ultra—a surfactant) at 60° C., in 30 seconds. This is an advantage since the message-removing step can be performed without having to use an additive (surfactant) in the caustic solution, thereby saving the costs associated with the additive and the disposal of the additive-containing spent caustic solution.

While the ink jet ink composition of the present invention is particularly suitable for printing on glass substrates, it is contemplated that other substrates such as metal, plastic, cardboard, or paper can also be printed with the ink jet ink composition.

The following example further illustrates the invention but, of course, should not be construed as in any way limiting its scope.

EXAMPLE

This Example illustrates embodiments of the ink jet ink composition of the present invention. Formulations 1–3 are embodiments of the ink jet ink composition of the invention.

| Ingredients | Wt % |
|---|---|
| Formulation 1 | |
| Methyl ethyl ketone (Ashland Chemical) | 50.2 |
| Ethanol CDA-19 200 Proof (EMCO Chemical) | 10.0 |
| JONCRYL 683 (SC Johnson Wax) | 11.0 |
| De-ionized water | 10.0 |
| Polyethyleneimine (Aldrich) | 0.2 |
| WET LINK 78 (GE Silicones) | 1.0 |
| SIL WET L-7622 (GE Silicones) | 0.1 |
| RIT-CIZER 8 (Rit-Chem) | 1.0 |
| BYK 065 (BYK-Chemie USA) | 0.2 |
| Tetrabutylammonium hexafluorophosphate (Ozark) | 1.3 |
| TINTERSOL Yellow 139 (Johnson Matthey Inc.) | 15.0 |
| Formulation 2 | |
| Methyl ethyl ketone (Ashland Chemical) | 49.2 |
| Ethanol CDA-19 200 Proof (EMCO Chemical) | 10.0 |
| JONCRYL 683 (SC Johnson Wax) | 11.0 |
| De-ionized water | 10.0 |
| Polyethyleneimine (Aldrich) | 0.2 |
| WET LINK 78 (GE Silicones) | 1.0 |
| SIL WET L-7622 (GE Silicones) | 0.1 |
| RIT-CIZER 8 (Rit-Chem) | 1.0 |
| BYK 065 (BYK-Chemie USA) | 0.2 |
| SOLSPERSE 38500 (Avecia) | 1.0 |
| Tetrabutylammonium hexafluorophosphate (Ozark) | 1.3 |
| TINTERSOL Yellow 139 (Johnson Matthey Inc.) | 15.0 |

-continued

| Ingredients | Wt % |
|---|---|
| Formulation 3 | |
| Methyl ethyl Ketone (Ashland Chemical) | 51.3 |
| Ethanol CDA-19 200 Proof (EMCO Chemical) | 10.0 |
| JONCRYL 683 (SC Johnson Wax) | 10.0 |
| De-ionized water | 10.0 |
| Polyethyleneimine (Aldrich) | 0.2 |
| WET LINK 78 (GE Silicones) | 1.0 |
| SIL WET L-7622 (GE Silicones) | 0.1 |
| Rit-Cizer 8 (Rit-Chem) | 1.0 |
| BYK 065 (BYK-Chemie USA) | 0.2 |
| SOLSPERSE 38500 (Avecia) | 1.0 |
| Tetrabutylammonium hexafluorophosphate (Ozark) | 1.2 |
| TINTERSOL Yellow 139 (Johnson Matthey Inc.) | 14.0. |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. An ink jet ink composition comprising one or more organic solvents, an acidic resin, a polyamine, an opaque pigment, and a hydrophobic conductive agent other than tetrabutylammonium tetrafluoroborate, wherein the hydrophobic conductive agent comprises a cation selected from the group consisting of tetraalkylammonium, tetraarylammonium, tetraalkylphosphonium, tetraarylphosphonium, and any combinations thereof, and an anion selected from the group consisting of hexafluorophosphate, tetrafluoroborate, tetraalkylborate, tetraarylborate, and any combinations thereof.

2. The ink jet ink composition of claim 1, wherein the opaque pigment is an opaque organic pigment.

3. The ink jet ink composition of claim 2, wherein the opaque organic pigment is an opaque yellow organic pigment.

4. The ink jet ink composition of claim 3, wherein the opaque yellow organic pigment is C.I. pigment yellow 139.

5. The ink composition of claim 2, wherein the one or more organic solvents are present in an amount of from about 40% to about 90% by weight, the acidic resin is present in an amount of from about 2% to about 25% by weight, the polyamine is present in an amount of from about 0.05% to about 2% by weight, the opaque organic pigment is present in an amount of from about 2% to about 15% by weight, and the hydrophobic conductive agent is present in an amount of from about 0.1% to about 5% by weight of the ink composition.

6. A method of printing a mark on a substrate comprising directing a stream of droplets of the ink jet ink composition of claim 2 onto a substrate and controlling the direction of the droplets so as to form the mark on the substrate.

7. The method of claim 6, wherein the substrate is glass.

8. The ink jet ink composition of claim 1, wherein the one or more organic solvents are selected from the group consisting of ketones, alcohols, esters, ethers, amides, and any combinations thereof.

9. The ink jet ink composition of claim 1, wherein an organic solvent is methyl ethyl ketone.

10. The ink jet ink composition of claim 1, wherein the acidic resin comprises carboxyl functionality.

11. The ink jet ink composition of claim 1, wherein the acidic resin has an acid number of from about 50 to about 250 mg of KOH/g of the resin.

12. The ink jet ink composition of claim 11, wherein the acidic resin has an acid number of from about 100 to about 200 mg of KOH/g of the resin.

13. The ink jet ink composition of claim 11, wherein the acidic resin is an acrylic resin.

14. The ink jet ink composition of claim 10, wherein the acrylic resin is a copolymer of styrene, alpha methyl styrene, and acrylic acid.

15. The ink jet ink composition of claim 1, wherein the polyamine is a polyethyleneimine.

16. The ink jet ink composition of claim 1, wherein the hydrophobic conductive agent is selected from the group consisting of tetrabutylammonium hexafluorophosphate, tetrapropylammonium hexafluorophosphate, tetraethylammonium hexafluorophosphate, tetramethylammonium hexafluorophosphate, tetrabutylammonium tetraphenylborate, tetrapropylammonium tetrafluoroborate, tetraethylammonium tetrafluoroborate, tetramethylammonium tetrafluoroborate, and any combinations thereof.

17. The ink jet ink composition of claim 16, wherein the hydrophobic conductive agent is selected from the group consisting of tetrabutylammonium hexafluorophosphate, tetrapropylammnonium hexafluorophosphate, tetrabutylammonium tetraphenylborate, and any combinations thereof.

18. The ink jet ink composition of claim 17, wherein the hydrophobic conductive agent is tetrabutylammonium hexafluorophosphate.

19. The ink jet ink composition of claim 1, further comprising one or more of a humectant, a co-solvent, a co-resin, a defoamer, an adhesion promoter, a plasticizer, a dispersing agent, and a surfactant.

20. The ink jet ink composition of claim 19, wherein the co-solvent is ethanol.

21. The ink jet ink composition of claim 1, further comprising water.

22. A method of printing a mark on a substrate comprising directing a stream of droplets of the ink jet ink composition of claim 1 onto a substrate and controlling the direction of the droplets so as to form the mark on the substrate.

23. The method of claim 22, wherein the substrate is glass.

24. The ink jet ink composition of claim 1, wherein the one or more organic solvents are present in an amount from about 60% to about 80% by weight of the ink jet ink composition.

25. A method of printing a mark on a substrate comprising directing a stream of droplets of the ink jet ink composition of claim 24 onto a substrate and controlling the direction of the droplets so as to form the mark on the substrate.

* * * * *